(12) United States Patent
Boatman

(10) Patent No.: US 6,459,853 B1
(45) Date of Patent: Oct. 1, 2002

(54) THERMAL CONTROL APPARATUS FOR HIGH PRESSURE PRODUCT SWIVEL

(75) Inventor: L. Terry Boatman, Houston, TX (US)

(73) Assignee: FMC Technologies, Inc., Chicago, IL (US)

(*) Notice: Subject to any disclaimer, the term of this patent is extended or adjusted under 35 U.S.C. 154(b) by 0 days.

(21) Appl. No.: 10/004,743

(22) Filed: Dec. 4, 2001

Related U.S. Application Data

(60) Provisional application No. 60/251,500, filed on Dec. 5, 2000.

(51) Int. Cl.[7] .............................. F24H 1/10; B63B 22/02
(52) U.S. Cl. .......................... 392/473; 392/497; 441/5; 114/230.1
(58) Field of Search ................................. 392/473, 497, 392/498, 499; 219/497, 494; 405/224.2; 441/5, 3, 4; 166/360, 351; 114/230.1

(56) References Cited

U.S. PATENT DOCUMENTS

| | | | |
|---|---|---|---|
| 3,969,781 A | * | 7/1976 | Reid, Jr. ..................... 141/387 |
| 4,315,408 A | * | 2/1982 | Karl ............................ 138/107 |
| 4,662,657 A | | 5/1987 | Harvey et al. |
| 4,741,541 A | | 5/1988 | Franken |
| 4,756,559 A | * | 7/1988 | Shimada et al. ........... 285/121.6 |
| 4,781,404 A | | 11/1988 | Tharp et al. |
| 4,819,966 A | | 4/1989 | Gibb |
| 5,205,768 A | | 4/1993 | Pollack |
| 5,242,198 A | | 9/1993 | Pollack |
| 5,279,240 A | * | 1/1994 | Worley ...................... 114/74 T |
| 5,312,140 A | | 5/1994 | Pollack |
| 5,411,298 A | | 5/1995 | Pollack |
| 5,760,292 A | | 6/1998 | Jostein |
| 5,823,837 A | | 10/1998 | Boatman et al. |
| 6,050,747 A | | 4/2000 | Midttveit |
| 6,093,068 A | | 7/2000 | Turner et al. |
| 6,161,834 A | | 12/2000 | Pollack et al. |
| 6,230,809 B1 | * | 5/2001 | Korsgaard ................... 166/352 |
| 2001/0037685 A1 | | 11/2001 | Bode |

* cited by examiner

Primary Examiner—Henry Bennett
Assistant Examiner—Thor Campbell
(74) Attorney, Agent, or Firm—Gary L. Bush; Andrews & Kurth, Mayor, Day & Caldwell, LLP

(57) ABSTRACT

In a fluid swivel with at least an outer housing and an inner housing, the temperature of both inner and outer housings are measured. When the temperature of the inner housing is greater than the temperature of the outer housing, a heating element elevates the temperature of the outer housing.

8 Claims, 1 Drawing Sheet

THERMAL CONTROL APPARATUS FOR HIGH PRESSURE PRODUCT SWIVEL

CROSS REFERENCE TO RELATED APPLICATION

This application claims priority from U.S. Provisional Application Ser. No. 60/251,500, filed on Dec. 5, 2000.

BACKGROUND OF THE INVENTION

1. Field of the Invention

This invention relates in general to high pressure product swivels used in offshore floating, production and/or storage systems which transfer hydrocarbon fluids from a geostationary turret to a rotatable vessel. In particular the invention is applicable for high pressure swivels with radially mounted seals which require close running fits between stationary and rotatable housings.

2. Description of the Prior Art

High pressure swivels with radially mounted seals between closely spaced inner and outer housings are known in the art of product swivel design. In some circumstances, the temperature of the inner housing of the swivel can rise to a higher level than that of the outer housing. As a result, because of the difference in the thermal expansion of the inner and outer housing, a large reduction in radial clearance between the two housings can result with probable seizing of the sliding surfaces between the two housings.

IDENTIFICATION OF OBJECTS OF THE INVENTION

A primary object of the invention is to provide an automatic temperature control system for equalizing the temperature between the inner and outer housings of a high pressure product swivel.

Another object of the invention is to provide an improved product swivel with a control system which prevents detrimental large temperature differences during operation between inner and outer housings.

Another object of the invention is to provide an improved product swivel with an automatic temperature control system with resulting smaller internal clearances and improved seal function.

Another object of the invention is to provide an improved product swivel with an automatic temperature control system which prevents high friction torque in bearings between stationary and rotating housings even in circumstances of high temperature of one of the housings.

Another object of the invention is to provide a fluid transfer system for an offshore floating production and/or storage vessel which has a high pressure fluid system with an automatic temperature control system which acts to prevent disastrous failure of the swivel torque arm and connected piping of the transfer system.

SUMMARY OF THE INVENTION

The objects identified above, along with other features and advantages of the invention are incorporated in a fluid swivel and automatic temperature control system which includes a swivel with an outer housing and an inner housing. The outer housing is arranged and designed for rotation with the vessel as the vessel weathervanes about the geostationary turret. The inner housing of the turret is mounted on the stationary turret. An automatic temperature control system includes temperature measurement devices on the inner and outer housings, a heating device on the outer housing and a temperature regulating mechanism responsive to the temperature measurement of the inner and outer housing to regulate the temperature of the outer housing.

DESCRIPTION OF PREFERRED EMBODIMENT OF THE INVENTION

Figure 1A:
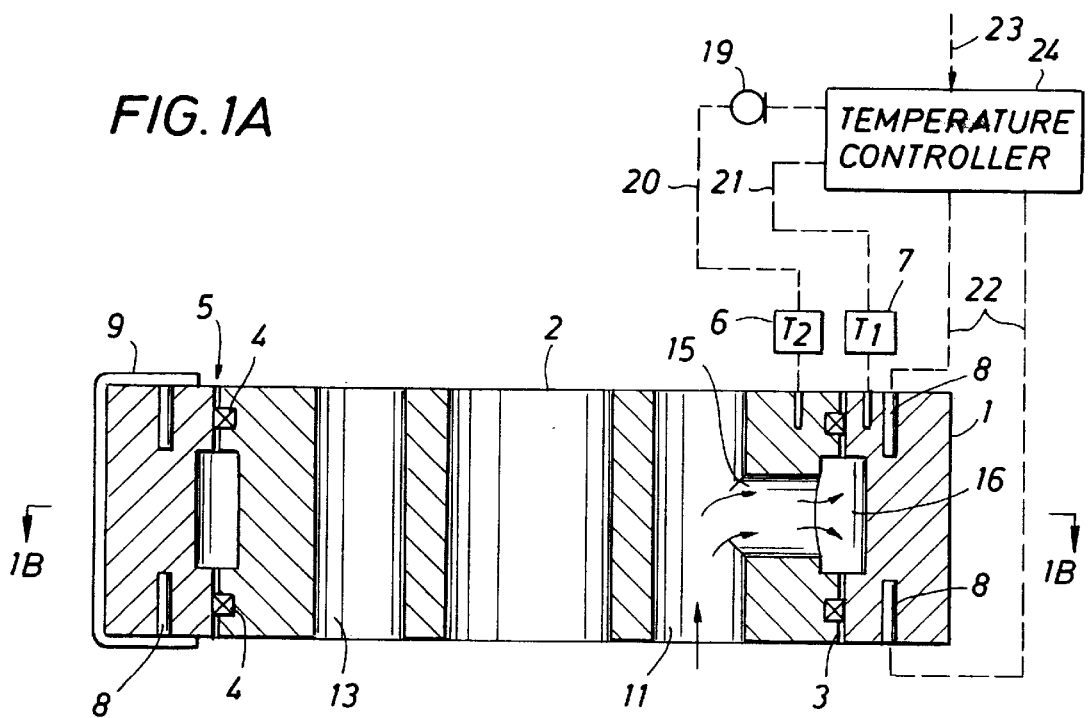
FIG. 1A is a cross section through a product swivel showing inner and outer housings thereof with temperature measurement devices in the inner and outer housings and a temperature regulating system arranged and designed to equalize the temperature of the outer housing to that of the inner housing.
Figure 1B:
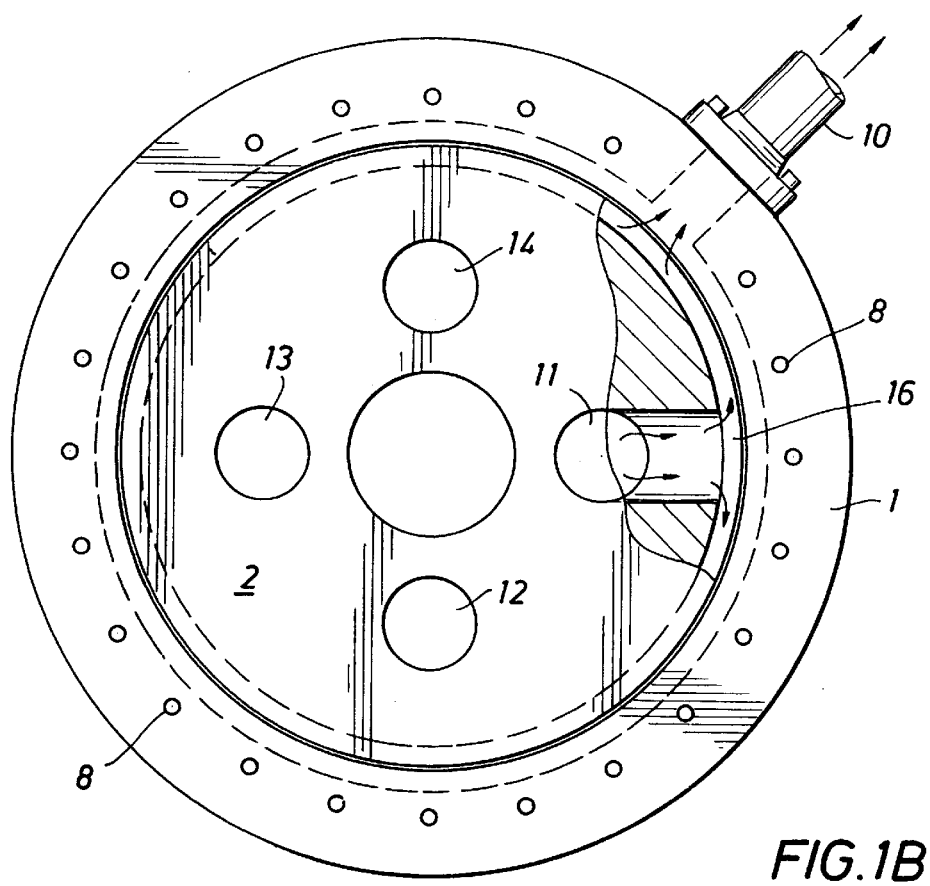
FIG. 1B is a view of the swivel of FIG. 1A, taken along lines 1B—1B.

The illustration of the product swivel of FIGS. 1A and 1B includes reference numbers to traditional elements of a product swivel for turret moored Floating Production, Storage and Offloading (FPSO) vessels and of the temperature control system improvement of this invention. Such reference numbers are defined here:

1. Outer housing of swivel
2. Inner housing
3. Radial bearing
4. Radial seal
5. Radial clearance at bearing between inner housing and outer housing
6. Thermocouple in inner housing
7. Thermocouple in outer housing
8. Electrical heating element
9. Insulating blanket with integral electric heaters
10. Pipe connection to outer housing
11. Flow path in inner housing
12. Flow path in inner housing
13. Flow path in inner housing to adjacent swivel
14. Flow path in inner housing to adjacent swivel
15. Flow path
16. Toroidal flow path between inner and outer housings
19. Electrical slip ring
20. Electrical conductors
21. Electrical conductors
22. Electrical conductors
23. Electrical power supply conductors
24. Temperature controller A complete fluid swivel assembly includes many ancillary components such as torque arms, retaining devices, multiple seals, lubrication ports, leak detection ports and the like as necessary for the swivel to function in an operating environment. These components are not relevant to the present invention and are omitted from FIGS. 1A and 1B for purpose of simple illustration. Liquid or gas flows through passages 11 and 15 of inner housing 2 into a toroidal shaped cavity 16 between housing 2 and housing 1. The fluid flow travels around toroidal path 16 until reaching the outlet port at pipe 10. Rotatable outer housing 1 turns with the vessel on bearings 3 while the fluids are contained under pressure by an arrangement of seals 4. The fluid directions can be reversed, and in some arrangements, the rotatable and non-rotatable housing are reversed as to that of the above description.

When radial seals are used in a swivel assembly designed for high pressures, such as 3000 Psi to 7500 Psi for example, a very close radial clearance 5 is required between the surfaces separating the outer housing 1 and inner housing 2. These radial clearances, sometimes called gaps, are in the order of 0.020 to 0.040 inch per side near the seals. Clearance at the radial bearings must be closer, such as 0.005 to 0.010 inch at the radial bearings 3 for the purpose of maintaining concentricity of the outer and inner housings.

Temperature difference between the outer and inner housing causes significant radial expansion differences. For example, using a typical bearing or seal diameter of 78 inches, a temperature difference of only 20° F. will reduce to zero a clearance of 0.005 inch per side. It is imperative that the outer housing 1 be prevented from cooling below a temperature that would reduce the internal clearances to near zero. Unanticipated high rotational torque would occur in the least, and at worst the sliding surface could seize together and cause disastrous failure of the swivel. At larger diameters, the differential contraction increases proportionally.

Fluid swivels such as the one illustrated in FIGS. 1A and 1B are commonly assembled together with several swivels stacked one on top of the other to provide multiple flow paths. Liquid and gases flow through the inner housing to the swivels above. Typically, the temperature of the flowing liquids and gas through the inner housing can reach 150° F. to 200° F. In some rare occasions even higher temperatures can be reached.

In normal service the outer and inner housings usually have sufficient liquids flowing through the swivel to assure the likelihood of both housings being nearly equal in temperature. The need for thermal control of the clearance occurs in situations where the liquid or gas flow is stopped for some reason. In some cases spare swivels are provided in a swivel stack in which no flow occurs until needed sometime in the future. In other cases, an individual swivel flow may be stopped for a time to favor a particular process situation. Meanwhile, the inner housings will have above-ambient temperature liquids and gas flowing through internal ports or piping. These circumstances allow the outer housings to lose heat to the atmosphere and remain cooler than the inner housings which are heated by passing hot fluids. These circumstances are made worse if the swivel is operating in very cold temperatures such as occur off the Canadian East coast or in the North Sea area.

The embodiment of the invention in FIG. 1A, 1B is arranged and designed with the objective of maintaining the outer swivel housing at a temperature at least as high as the inner housing. This is necessary only when no liquid or gas is flowing through the swivel flow path. It is acceptable for the outer housing 1 to be at a higher temperature than the inner housing, because this serves to increase clearances, not decrease them. A temperature sensor 6, such as a thermocouple or the like, is located to measure inner housing 2 temperature (T2). Temperature sensor 7 measures the outer housing 1 temperature (T1). Electrical conductors 20 and 21 carry signals to temperature controller 24. Electrical slip ring 19, or outer suitable remote transmission means, carries the T2 temperature signal across from the non-rotating vessel mounted inner housing to the rotating controller 24. Electrical power is delivered to controller 24 by conductors 23. Controller 24 compares temperatures T1 and T2. If temperature T2 is greater than T1, controller 24 switches on the electrical power to heaters 8 through conductors 22. Heaters 8 are distributed around the outer housing as necessary for uniform heating. An alternative arrangement provides a thermal insulating and heating blanket 9 wrapped around the outer housing to maintain outer housing 1 temperature with the best thermal efficiency. Heating of outer housing 1 continues until its temperature is at least equal to the temperature of inner housing 2. At that point the controller turns off the electrical power to the heating elements 8 or 9.

It is to be understood that the invention is not limited to the exact details of construction, operation, exact materials, or embodiments shown and described, as obvious modifications and equivalents will be apparent to one skilled in the art. For example, while the embodiment of FIGS. 1A and 1B illustrate the heating element as a heater 8 or a thermal insulating and heating blanket 9, any equivalent device could be used including, but not limited to a removably attachable heating element. Also, while the embodiment of FIGS. 1A and 1B illustrate one inner housing and one outer housing, the invention as described above may also be used in swivel designs having multiple concentric housings about a middle housing for the purpose of reducing radial deflections caused by internal pressure. In this case additional temperature sensors are provided to individually control the heating of more than one housing. Furthermore, while the invention can operate in an automatic mode using the temperature controller 24, another embodiment includes a manual operation. In a manual operation, an operator reads the temperature via a dial coupled to the temperature sensors 6 and 7 (or readout on the temperature controller 24) and manually engages the heating element 8 or 9 to elevate the temperature of the outer housing 1. The engagement in a manual operation embodiment, occurs where an operator operates a circuit switch allowing electrical power to travel through conductors 22 to heating elements 8 or 9; alternatively, it occurs where an operator removably couples one or more heating elements to the outer housing (or housings, if a plurality of housings is provided). Accordingly, the invention is therefore limited only by the scope of the claims.

What is claimed is:

1. An improved product swivel having an inner housing and an outer housing rotatably supported on said inner housing, characterized by:

a first temperature measuring device coupled to said inner housing for generating an inner housing temperature signal, a second temperature measuring device coupled to said outer housing for generating an outer housing temperature signal, a heating element arranged and designed for coupling to said outer housing, a source of electrical power, and a temperature regulating circuit responsive to said inner housing temperature signal and to said outer housing temperature signal which applies said source of electrical power to said heating element when said inner housing temperature signal is greater than said outer housing temperature signal.

2. The product swivel of claim 1, wherein the product swivel includes a fluid flow path with a first outlet in said inner housing, a second outlet in said outer housing and a toroidal flow path between said first and second outlets.

3. A method of regulating a temperature differential on a fluid swivel, wherein the fluid swivel has an inner housing and an outer housing rotatably supported on said inner housing, comprising the steps of:

monitoring a first temperature on said inner housing;

monitoring a second temperature on said outer housing; and applying thermal energy to said outer housing when said first temperature is greater than said second temperature.

4. The method of claim 3, wherein the steps are carried out automatically via a temperature controller.

5. The method of claim 4, wherein the steps are carried out manually.

6. The method of claim 3, wherein the steps of monitoring the first and second said temperature is carried out automatically via a temperature controller, and wherein the step of applying thermal energy is carried out manually.

7. The method of claim 3, wherein the thermal energy is applied via a means for heating.

8. A method of regulating a temperature differential on a fluid swivel, wherein the fluid swivel has an inner housing and an outer housing rotatably supported on said inner housing, comprising the steps of:

monitoring a first temperature on said inner housing, creating a first temperature signal;

monitoring a second temperature on said outer housing, creating a second temperature signal;

transferring said first and second temperature signals to a temperature controller;

comparing said first and second temperature signals with said temperature controller; and transferring electrical power from a power source to at least one heating element, embedded in said outer housing, via said temperature controller, wherein said electrical power is only transferred when said first temperature is greater than said second temperature.

* * * * *

UNITED STATES PATENT AND TRADEMARK OFFICE
CERTIFICATE OF CORRECTION

PATENT NO.   : 6,459,853 B1
DATED        : October 1, 2002
INVENTOR(S)  : L. Terry Boatman It is certified that error appears in the above-identified patent and that said Letters Patent is hereby corrected as shown below:

<u>Column 3,</u>
Line 13, after the word "Clearance" insert -- 5 --
Line 20, delete "."

Signed and Sealed this

Eighteenth Day of March, 2003

JAMES E. ROGAN
*Director of the United States Patent and Trademark Office*